United States Patent
Silagyi et al.

(10) Patent No.: US 8,372,229 B2
(45) Date of Patent: Feb. 12, 2013

(54) METHOD FOR COUPLING CORRUGATED PIPE SEGMENTS

(75) Inventors: Jerome S. Silagyi, Mechanicsburg, PA (US); Mark Dick, New Cumberland, PA (US); Brian Chestnut, Mechanicsburg, PA (US)

(73) Assignee: Lane Enterprises, Inc., Camp Hill, PA (US)

( * ) Notice: Subject to any disclaimer, the term of this patent is extended or adjusted under 35 U.S.C. 154(b) by 344 days.

(21) Appl. No.: 12/818,216

(22) Filed: Jun. 18, 2010

(65) Prior Publication Data

US 2010/0320745 A1 Dec. 23, 2010

Related U.S. Application Data

(60) Provisional application No. 61/218,753, filed on Jun. 19, 2009.

(51) Int. Cl.
*B29C 65/34* (2006.01)
*F16L 47/03* (2006.01)

(52) U.S. Cl. .................. 156/158; 156/273.9; 156/304.3; 156/304.6; 285/21.2; 285/903

(58) Field of Classification Search .................. 156/158, 156/273.9, 274.2, 304.2, 304.3, 304.6; 285/21.1, 285/21.2, 903; 219/535
See application file for complete search history.

(56) References Cited

U.S. PATENT DOCUMENTS

| | | | |
|---|---|---|---|
| 5,252,157 A * | 10/1993 | Inhofe, Jr. | 156/158 |
| 5,407,514 A | 4/1995 | Butts et al. | |
| 5,407,520 A | 4/1995 | Butts et al. | |
| 5,722,824 A * | 3/1998 | Beck | 431/125 |

OTHER PUBLICATIONS

"DuroMaxx—Steel Reinforced Polyethylene Pipe" Brochure, Contech Construction Products Inc., 8 pgs., Copyright 2010, www.contech-cpi.com.
DuroMaxx—Specification, Contech Construction Products Inc., 2 pgs., May 2010, www.contech-cpi.com.
"Plastic Welding System", Powercore International, 2 pgs., Copyright 2005.
"NPC—Internal Joint Seals", Trelleborg Engineered Systems, 2 pgs., Oct. 2008.
"Standard Practice for Heat Fusion Joining of Polyethylene Pipe and Fittings", ASTM International, 19 pgs., Dec. 1, 2006.

* cited by examiner

*Primary Examiner* — Michael Tolin
(74) *Attorney, Agent, or Firm* — McNees Wallack & Nurick LLC (57) ABSTRACT

A method for coupling corrugated pipe segments is disclosed. The method includes providing first and second thermoplastic corrugated pipe segments arranged to form a fluid flow path and aligning ends of the pipe segments adjacent one another to form a joint. The method further includes providing a coupling assembly having a thermoplastic sheet with a flexible weld rod of a thermoplastic material attached thereto and circumferentially contacting the coupling assembly with the first and second thermoplastic pipe segments. An electrical current is applied to the weld rod to cause the weld rod, sheet and pipe segments to fuse to one another and form a circumferential weld seam on each side of the joint.

20 Claims, 5 Drawing Sheets

METHOD FOR COUPLING CORRUGATED PIPE SEGMENTS

RELATED APPLICATION

This application claims priority to U.S. Provisional Application No. 61/218,753, filed Jun. 19, 2009.

FIELD

The present disclosure is generally directed to joining pipe segments and more particularly to a method for joining corrugated pipe segments.

BACKGROUND

Piping systems are widely used throughout the construction industry for storm sewers, culverts, underground detention and/or retention, stormwater management, sanitary sewer and many other purposes related to drainage. These piping systems are typically complex and spread over a large area. As a result, the construction of such systems invariably results in the connection of pipe segments to one another. Where pipe segments are joined, they should be adequately connected to prevent leakage that can lead to erosion and costly repairs, as well as environmental damage.

The ability to join pipe segments during construction is often complicated by the need to cut pipes or fittings to size, meaning that the joining process occurs in the field, often with the pipe already situate in its end location in a trench, particularly in the case of field repairs. This can lead to even greater difficulty in achieving water tight joints at levels consistent with industry standards and/or required by environmental regulations.

While various methods have been used over the years for connecting different types of pipe segments in such systems, connecting corrugated pipe, sometimes referred to as profile-wall pipe, presents some additional challenges. One current method for joining corrugated pipe segments is the use of a wrap-around coupler that utilizes a mastic material to seal the joint between pipes. However, these types of couplers are expensive and may fall short of providing an in situ water-tight connection, particularly in instances of high groundwater levels. As a result, this coupler is not ordinarily considered a viable option in many situations.

Another option that better meets water tight standards for plain-end or field-cut corrugated pipe is a bell/bell coupler. However, one problem with this type of coupling system is that it requires gaskets to fill the valleys of the corrugated pipe, resulting in added expense. In-line bell and spigot configurations generally use spigots with reduced corrugations containing a groove at the crest to fit a low profile, economized gasket. As a result, plain-end or field-cut pipe uses a gasket to completely fill the valley between corrugations. The larger the pipe, the larger the space between corrugations, further increasing the expense of the valley gasket.

Heat fusion has been used to join smooth wall pipe segments, particularly where straight pipe is joined with fittings, in which fusible couplers in the form of collars or rings containing helically wound strands of embedded wire to facilitate electrofusion are used. Aside from being cost prohibitive for field joining, this solution is not useful for corrugated pipe due to its profile and differences in wall thickness.

What is currently lacking is a reliable, cost-efficient method for coupling thermoplastic corrugated pipe segments in the field in a robust, workable manner.

It would be desirable to provide a method of coupling corrugated pipe segments that meets some or all of these needs.

SUMMARY

According to an exemplary embodiment, a method for coupling corrugated pipe segments is disclosed. The method comprises providing first and second thermoplastic corrugated pipe segments arranged to form a fluid flow path therethrough, aligning ends of the first and second pipe segments adjacent one another to form a joint, providing a coupling assembly comprising a thermoplastic sheet having a flexible weld rod comprising a thermoplastic material attached thereto, circumferentially contacting the first and second thermoplastic pipe segments with the coupling assembly and applying an electrical current to the weld rod to cause the weld rod, sheet and pipe segments to fuse to one another and form a circumferential weld seam on each side of the joint.

According to another exemplary embodiment, a method for coupling corrugated pipe segments includes providing first and second thermoplastic corrugated pipe segments arranged to form a fluid flow path therethrough, aligning ends of the first and second pipe segments adjacent one another to form a joint, providing a coupling assembly comprising a thermoplastic sheet having a flexible weld rod comprising a thermoplastic material attached thereto and further comprising a plurality of corrugation alignment tabs attached to the sheet, the sheet having a thickness that is about the same as corrugation elements of each of the first and second pipe segments, circumferentially contacting the first and second thermoplastic pipe segments with the coupling assembly by wrapping the coupling assembly around an external surface of the first and second pipe segments such that the weld rod encircles the pipe segment on each side of the joint and the weld rod is in contact with the sheet and the external surface of the pipe segments and such that at least one corrugation alignment tab is disposed within a valley between adjacent corrugations of the first pipe segment and at least one corrugation alignment tab is disposed within a valley between adjacent corrugations of the second pipe segment. While exerting a continuous force to maintain compression between the coupling assembly and the external surface of the pipe segments, an electrical current is applied to the weld rod to cause the weld rod, sheet and pipe segments to fuse to one another and form a circumferential weld seam on each side of the joint.

According to yet another embodiment, a method for coupling pipe segments includes providing first and second thermoplastic pipe segments arranged to form a fluid flow path therethrough, aligning ends of the first and second pipe segments adjacent one another to form a joint, providing a coupling assembly comprising a thermoplastic sheet having a flexible weld rod comprising a thermoplastic material attached thereto, the sheet having a thickness that is about the same as corrugation elements of each of the first and second pipe segments, circumferentially contacting the first and second thermoplastic pipe segments with the coupling assembly by wrapping the coupling assembly about an internal surface of the first and second pipe segments such that the weld rod encircles the inner surface of the pipe segments on each side of the joint and the weld rod is in contact with the sheet and the internal surface of the pipe segments, and while exerting a continuous force to maintain compression between the coupling assembly and the internal surface of the pipe segments, applying an electrical current to the weld rod to cause the weld rod, sheet and pipe segments to fuse to one another and form a circumferential weld seam on each side of the joint.

An advantage is that corrugated pipe segments can be coupled to achieve a robust, water-tight seal. The seal can conveniently be accomplished in a workable manner, even where the pipe is already in the field.

Another advantage is that methods in accordance with exemplary embodiments can be used to accomplish coupling of pipe segments by either one or both of internally and externally positioned seals, allowing for flexibility in dealing with changing circumstances that may occur in the field at the location where the pipe segments are being installed.

Other features and advantages of the present invention will be apparent from the following more detailed description of the preferred embodiment, taken in conjunction with the accompanying drawings which illustrate, by way of example, the principles of the invention.

DETAILED DESCRIPTION OF EXEMPLARY EMBODIMENTS

Exemplary embodiments are directed to a method of joining fusible thermoplastic pipe segments using a coupling assembly that includes a thermoplastic weld rod attached to a thermoplastic sheet in which the material for the weld rod and sheet of the coupling assembly and that of the pipe segments being joined are either all of the same composition or are all of a similar polymer chemistry. By "similar polymer chemistry" is meant like materials having similar chief properties such as density and melt index that are fusible to one another.

The coupling assembly can be wrapped circumferentially around the exterior surface of the ends of the pipe segments for an external coupling or it can be wrapped circumferentially about the interior surface of the ends of the pipe segments for an internal coupling. By energizing the weld rod, the weld rod and localized areas of the sheet and pipe segments with which the weld rod is in contact are melted and, when the rod is de-energized, the localized melted areas fuse together upon cooling to form a water-tight seal.

Figure 1:
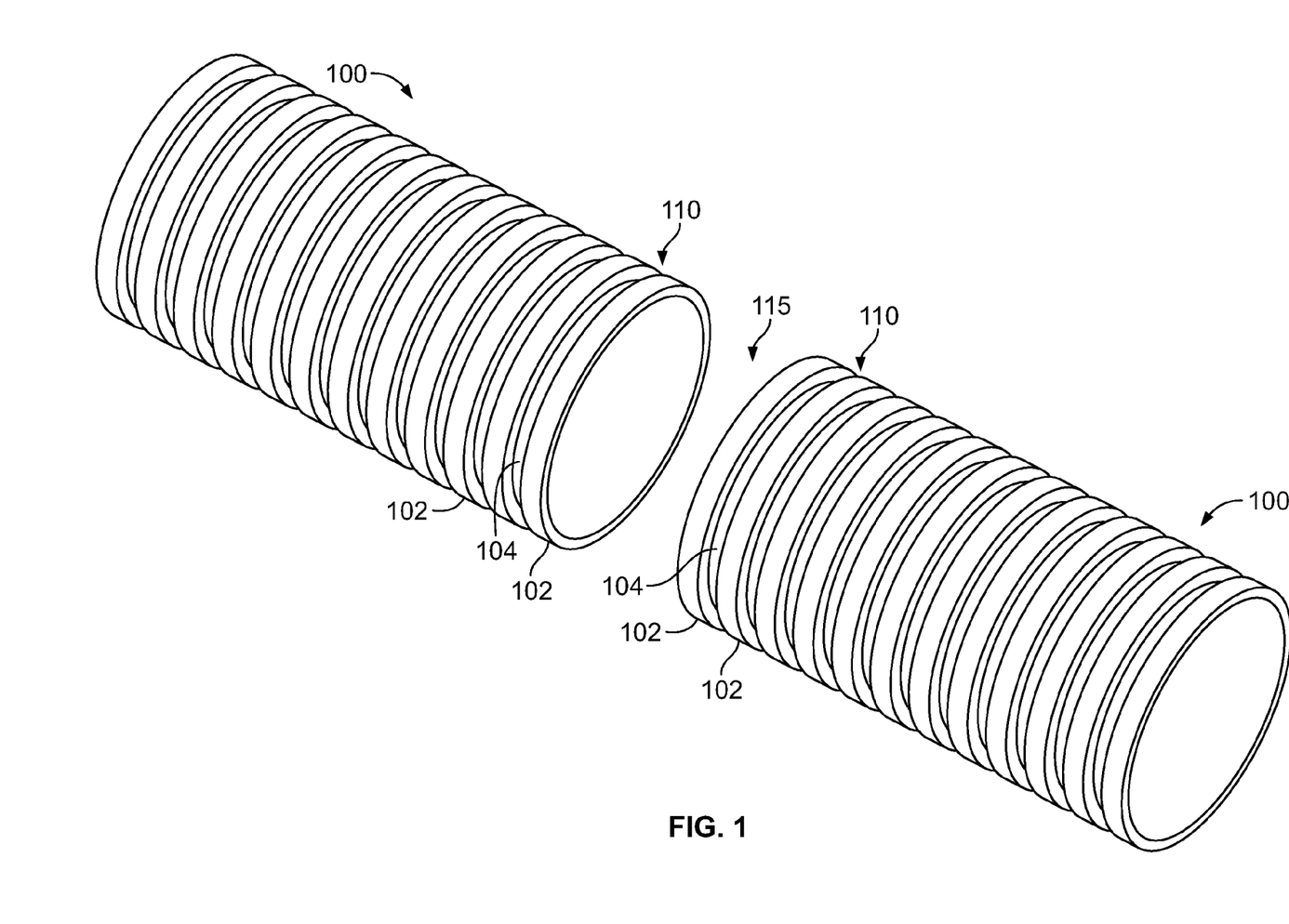
FIG. 1 illustrates two corrugated pipe segments to be connected in accordance with an exemplary embodiment.
Figure 4A:
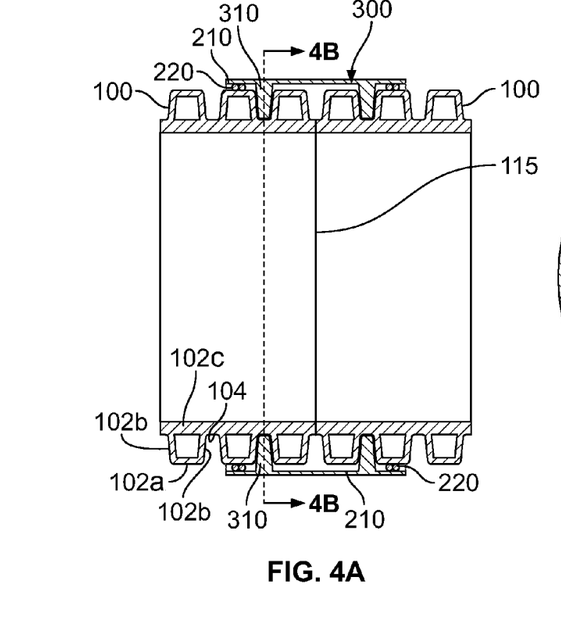
FIGS. 4A and 4B illustrate cross-sectional views of a coupling assembly for coupling pipe segments according to an external coupling application.

FIG. 1 illustrates two corrugated pipe segments 100 having conventional corrugation elements (i.e., crest 102a, webs 102b, liner 102c, and valley 104, best seen in FIG. 4A) arranged to form a series of alternating corrugations 102 and valleys 104. While both pipe segments 100 in FIG. 1 are shown as corrugated, it will be appreciated that in situations in which a pipe segment 100 has a corrugated external surface, the internal surface of that pipe segment may be smooth or corrugated. It will further be appreciated that, while shown as straight segments for purposes of illustration, one or more of the pipe segments 100 coupled according to exemplary embodiments can have any suitable shape or form and it is specifically contemplated that the term "pipe segments" refers to straight pipe, curved pipe and pipe fittings.

In a typical embodiment, the pipe segments 100 are of the same diameter and cross-sectional profile. The respective corrugation elements in the pipe segments are also typically of the same thickness (i.e., the respective thicknesses of the crest 102a, web 102b, web 102c, and valley 104 are substantially the same from one corrugated pipe segment 100 to the next). The thickness of the corrugation elements is usually in the range of between about 1/16 inch to about 3/8 inch. The pipe segments may be formed from high density polyethylene (HDPE), although other fusible thermoplastic material, such as polypropylene (PP), for example, may also be used. In one embodiment, the pipe segments 100 are constructed in accordance with ASTM or AASHTO standards, such as those available from Lane Enterprises of Camp Hill, Pa.

During pipe system construction, two or more pipe ends 110 are arranged adjacent one another for the continuous flow of a fluid through the pipe segments 100 forming the pipe system and establishing a fluid flow path. In order to keep fluid flowing through the pipe segments and prevent leaking at the joint 115 where the ends 110 of the pipe segments 100 meet, the pipe segments 100 are coupled together. The joint 115 of FIG. 1 is exaggerated for illustrative purposes and, in practice, the ends 110 of pipe segments 100 are typically positioned immediately adjacent one another so as to be in contact. However, the ends 110 are not necessarily completely flush with one another. For example, in field coupling operations, where pipe segments 100 may need to be cut to size, a field-cut end 110 may be rough or rugged from the cutting operation, which may result in gaps at various locations about the circumference of the pipe segments 100 at the joint 115, enhancing the importance of achieving a good seal when coupling pipe segments in the field.

Figure 2:
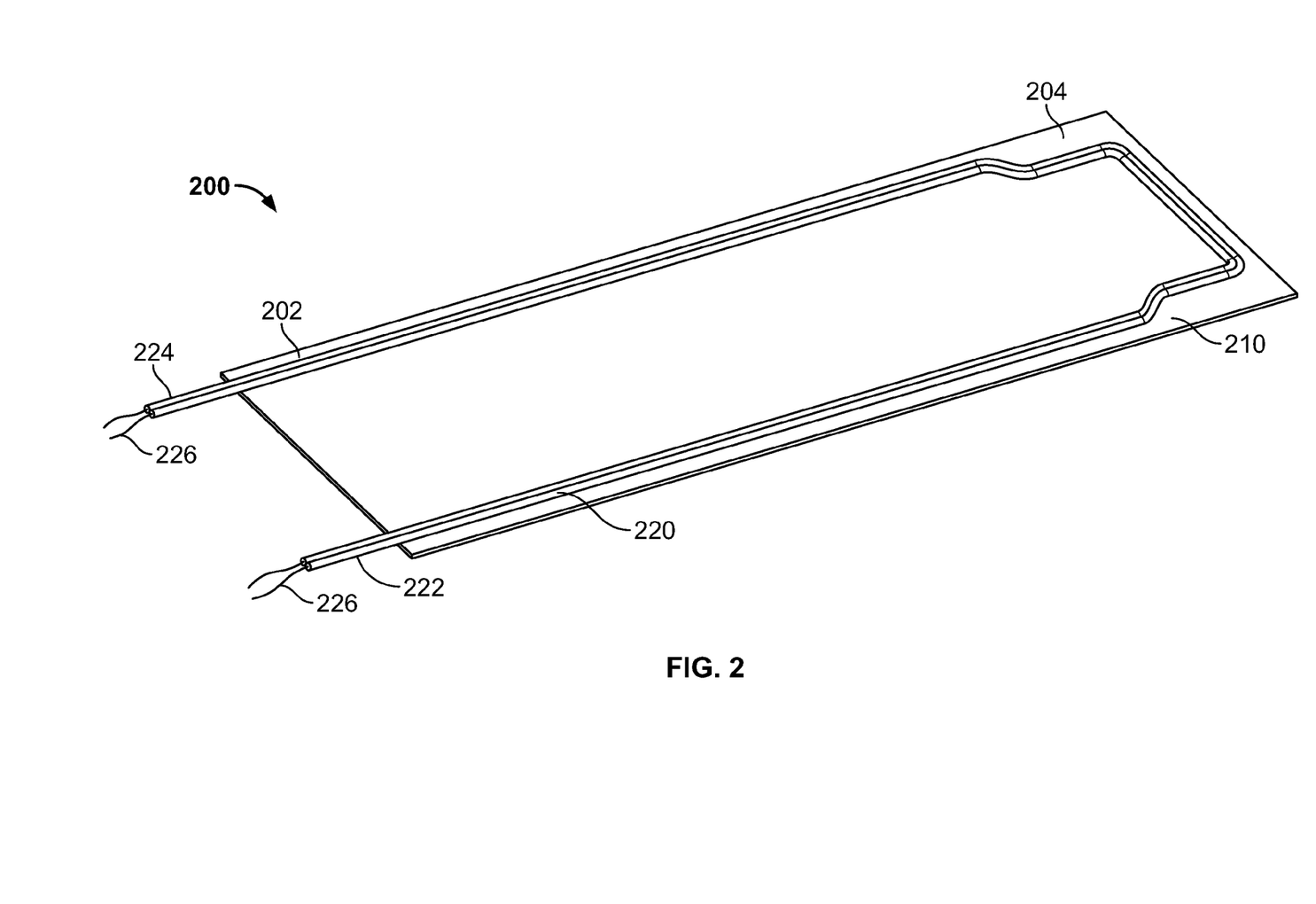
FIG. 2 illustrates a coupling assembly for use in connecting two segments of corrugated pipe in accordance with an exemplary embodiment.
Figure 3:
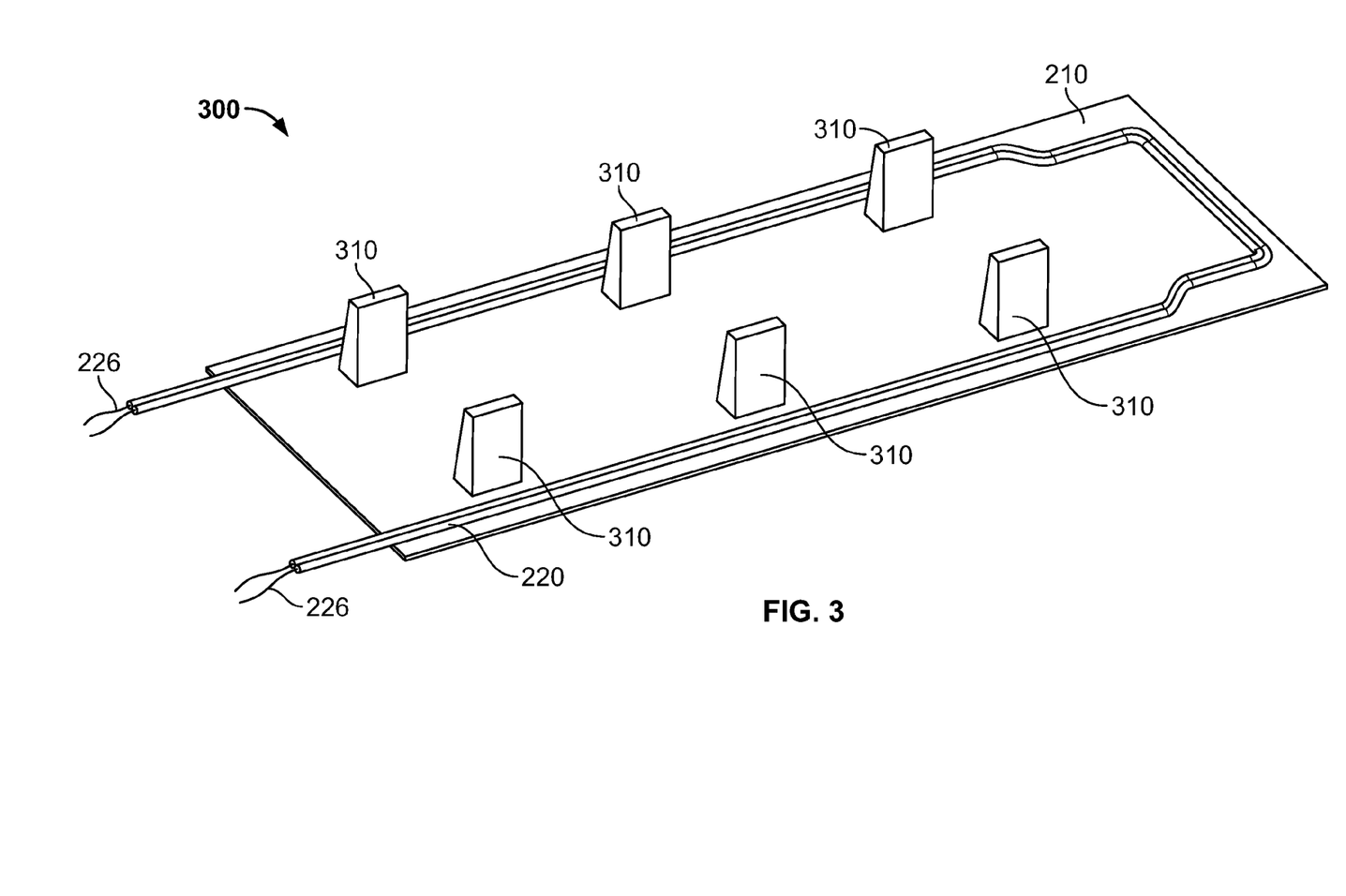
FIG. 3 illustrates a coupling assembly for use in connecting two segments of corrugated pipe in accordance with another exemplary embodiment.

According to an exemplary embodiment, the coupling of the pipe segments 100 is accomplished by covering the joint 115 with a coupling assembly used to form circumferential weld seams on each side of the joint 115. These seams seal the joint 115 and prevent fluid from leaking from the pipe system at the joint 115. FIGS. 2 and 3 illustrate exemplary coupling assemblies 200, 300 for coupling the pipe segments 100 and sealing the joint 115.

With respect to FIG. 2, the coupling assembly 200 includes a thermoplastic sheet 210, preferably of the same material of construction used for the pipe segments 100, although it may be a different material having a similar polymer chemistry as previously described.

The coupling assembly 200 also includes a flexible weld rod 220 of a fusible material comprising a thermoplastic attached to the sheet 210. Like the sheet 210, the particular thermoplastic material used for the weld rod 220 is selected to match the material of the pipe segments 100, e.g. HDPE, such that it is fusible with the sheet 210 and the pipe segments 100. In one embodiment, the weld rod 220 is an elongate thermoplastic material embedded with one or more resistance wires that extends substantially coaxially with the elongate thermoplastic material. One suitable flexible thermoplastic weld rod 220 for use in accordance with exemplary embodiments is a Powercore Weld rod available from Powercore International, Ltd. of Ottawa, Ontario.

Because the weld rod 220 is flexible, a single weld rod can be attached to the sheet 210 as shown in FIG. 2. A first end 222 of the weld rod 220 extends from a first end 202 of the sheet 210 to an opposite second end 204 of the sheet 210 along one edge that will later be used to form a first circumferential seal. The weld rod 220 then turns to extend along the edge of the second end 224 of the sheet 210, which provides for an axial seam that joins the second end 224 of the sheet 210 to the first end 222 when the coupling assembly 200 is used. From the second end 224, the weld rod 220 returns to the first end 222 of the sheet along the opposite edge of the sheet 210 by which it approached in a substantially parallel line, with a second end 224 of the weld rod 220 extending away from the sheet 210. The wire 226 embedded in the thermoplastic weld rod 220 extends beyond the ends 222, 224 of the weld rod 220 to be connected to a power source (not shown) that sends a current through the wire 226 to energize it during the welding operation.

The weld rod 220 is attached to the sheet 210 prior to the welding operation to form the coupling assembly 200. The weld rod 220 may be attached by any suitable manner that keeps it properly positioned on the sheet 210 prior to use, preferably without any advance melting of the sheet 210 or weld rod 220. One suitable method includes thermoforming the weld rod 220 to the sheet 210. As illustrated, two weld rods 220 positioned adjacent one another are used, although a single weld rod 220 may be sufficient while in other cases it may be desirable to use three or more weld rods 220 aside of each other.

The coupling assembly 200 shown and described with respect to FIG. 2 may be used for external coupling arrangements, as well as for internal coupling arrangements, particularly when the pipe segment 100 has a smooth interior. In an alternative embodiment shown in FIG. 3, a coupling assembly 300 is shown that is otherwise the same as that of FIG. 2, but includes one or more corrugation alignment tabs 310 extending from the sheet 210. The corrugation alignment tabs 310 are sized to fit within the valley 104 between two adjacent corrugations 102 (FIG. 1) of a pipe segment 100. The tabs 310 may be useful for proper alignment of the coupling assembly 300 prior to and during the welding process to join the pipe segments 100.

The corrugation alignment tabs 310 may be provided as separate components that may be attached to the sheet 210 or, alternatively, may be formed integral with the sheet 210. As illustrated, six tabs 310 are shown, positioned on the sheet 210 such that there are three tabs 310 on each side of the joint 115 when the coupling assembly 300 is wrapped around the ends 110 of the pipe segments 100. It will be appreciated that a greater or fewer number of corrugation alignment tabs 310 may be used and that the number of tabs on each side of the joint need not be equal.

In any case, the coupling assembly 200, 300 is long enough to extend around the entire circumference of the pipe segments to be joined and to at least slightly overlap itself such that the ends 202, 204 of the sheet 210 can be sealed together. The sheet 210 should be wide enough to extend at least several inches on either side of the joint 115, and preferably has a width that extends to at least entirely cover the first corrugation 102 of each of the pipe segments 100 being joined. In embodiments in which corrugation alignment tabs 310 are used, the sheet is wide enough such that the edges extend to at least the second corrugation 102 from the end 110 of the pipe segment 100.

Figure 4B:
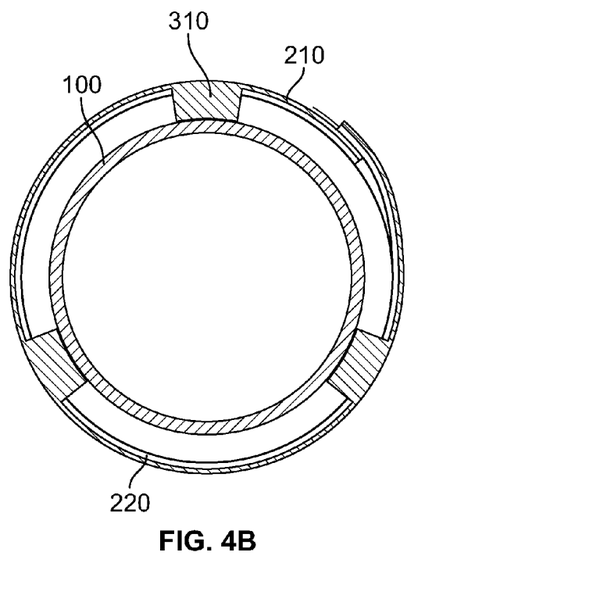
Figure 6:
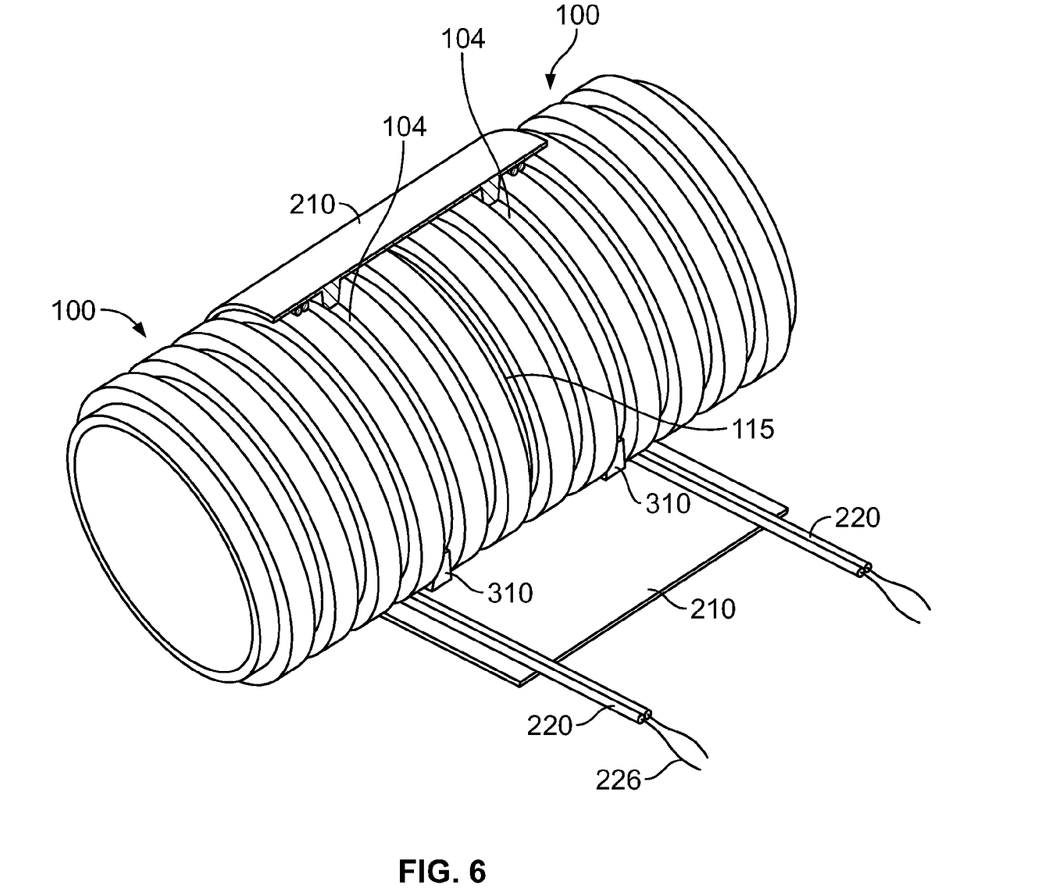
FIG. 6 illustrates a perspective view of the manner in which the coupling assembly of FIG. 3 can be wrapped around two segments of corrugated pipe.

Turning to FIGS. 4A and 4B, cross-sectional views are shown of the ends 110 of the pipe segments 100 of FIG. 1 about which the coupling assembly 300 of FIG. 3 has been wrapped around the external surface. A perspective view is shown in FIG. 6, with a portion of the coupling assembly 300 removed for purposes of illustration. The coupling assembly 300 is positioned such that the weld rod 220 is in contact with both the sheet 210 and the external surface of the pipe segments 100 on each side of the joint 115 and the corrugation alignment tabs 310 are situated within respective valleys 104 on each side of the joint 115.

The surface of the pipe segments 100 should be clean and dry prior to wrapping the joint 115 with the coupling assembly 300. After the coupling assembly 300 is wrapped around the pipe segments 100 and properly positioned, wires 226 extending from the ends of the weld rod 220 are connected to a power source (not shown) as previously discussed.

When the weld rod 220 is energized by the power source, current flows through the resistance wires 226 embedded within the weld rod 220 and this causes a rise in temperature sufficient to heat the weld rod 220 and local regions of the sheet 210 and pipe segments 100 in contact with the weld rod 220. This rise in temperature results in localized viscoelastic melting in which the rod 220, sheet 210 and pipe segments 100 become fused to one another to form weld seams at the interface of the weld rod 220 and the portions of the sheet 210 and pipe segments 100 in contact therewith. This results in the formation of two circumferential seams, one on either side of the joint 115, effectively sealing the joint 115. An axial seam is also formed where the ends of the encircled coupling assembly 300 are joined. Any excess portions of the coupling assembly 300 may be trimmed away.

The size of the weld rod 220 and the amount of current applied to accomplish the desired level of melting may depend upon the thickness of the sheet 210 and the corrugation elements of the pipe segments 100, as well as the materials of their construction. The sheet 210 should be of substantially the same thickness as the crest 102a or liner 102c of the corrugated pipe segment 100 to ensure even melting. According to one embodiment, the crest 102a and/or liner 102c of the pipe segments 100 and the sheet 210 are each ⅛ inch thick HDPE. In this embodiment, it may be desirable to use an 8 gauge HDPE weld rod 220 energized with around 42-47 amps for a time of about 7 to 8 minutes.

As the weld rod 220 and the regions of the pipe segments 100 and sheet 210 in contact with the weld rod 220 melt, the weld rod 220 and sheet 210 have a tendency to flow with respect to the pipe segments 100. This flow can result in slippage which may in turn lead to a risk of an incomplete seal during formation of the weld seam. One manner in which the effects of melt-flow can be avoided is to apply a continuous pressure to maintain compression between the pipe segments 100 and the coupling assembly 300 throughout the welding process to more fully integrate the weld seam between the components being joined. It will be appreciated that although the pressure is continuous, is not necessarily of a uniform magnitude through the welding process.

Application of a continuous pressure may be accomplished through any suitable mechanism of applying an appropriate force, which may also be used to hold the coupling assembly 300 in place about the joint 115 during the coupling process prior to initiating the weld. In one embodiment, one or more rubber straps (not shown) are wrapped around the coupling assembly 300, with a buckle or other device to hold the rubber strap in tension. As the materials melt during the weld process, the rubber strap tries to pull away from the buckle, exerting a continuous compressive force on the coupling assembly 300 and holding it firmly against the surface of the pipe segments 100 until the weld process is complete.

Figure 5:
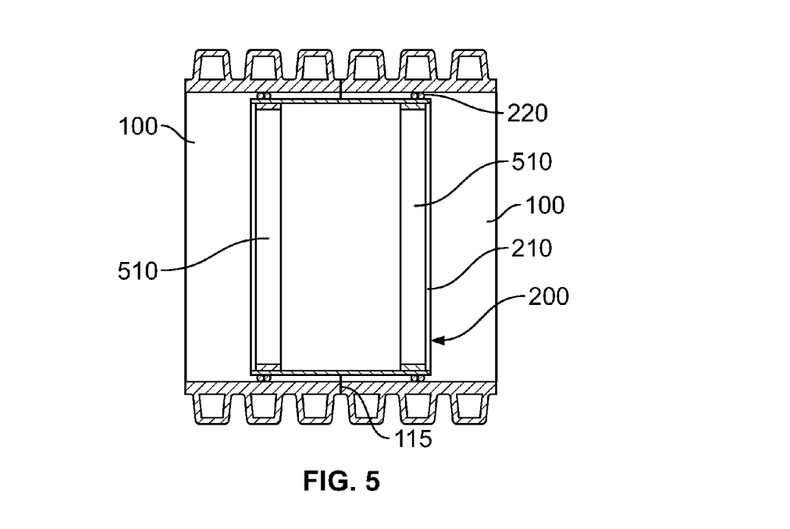
FIG. 5 illustrates a cross-sectional view of a coupling assembly for coupling pipe segments according to an internal coupling application.

FIG. 5 illustrates a cross-sectional view of the ends 110 of the pipe segments 100 of FIG. 1 about which the coupling assembly 200 of FIG. 2 has been wrapped about the smooth interior surface. The method of accomplishing the internal coupling is generally the same as discussed previously with respect to that of an external coupling, except that the coupling assembly 200 is positioned about the joint 115 on the internal surface of the pipe segments 100.

Like the external coupling process, a force should be applied continuously throughout the welding process to keep the interior surface of the pipe segments 100 in compression with the weld rod 220 and the sheet 210 of the coupling assembly 200. In one embodiment, this force may be accomplished through the use of one or more compression rings 510 positioned against the coupling assembly 200, such that the coupling assembly 200 is intermediate the pipe wall and the compression ring. The compression rings 510 may be as simple as circular bands of metal held in tension so that as the weld rod 220 of the coupling assembly 200 is heated and melts, along with localized portions of the pipe wall and sheet 210, the compression rings 510 expand, exerting a continuous force on the coupling assembly 200 to maintain compression against the pipe segments 100 throughout the welding process.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof.

What is claimed is:

1. A method for coupling pipe segments comprising:
providing first and second thermoplastic corrugated pipe segments arranged to form a fluid flow path therethrough;
aligning ends of the first and second pipe segments adjacent one another to form a joint;
providing a coupling assembly comprising a thermoplastic sheet having a flexible weld rod comprising a thermoplastic material attached to an outer surface of the thermoplastic sheet;
circumferentially contacting the first and second thermoplastic pipe segments with the coupling assembly; and
applying an electrical current to the weld rod to cause the weld rod, sheet and pipe segments to fuse to one another and form a circumferential weld seam on each side of the joint.

2. The method of claim 1, wherein the step of providing pipe segments further comprises providing a corrugated pipe segment having a smooth interior surface.

3. The method of claim 1, wherein the step of providing a coupling assembly further comprises providing a plurality of corrugation alignment tabs attached to the sheet.

4. The method of claim 3, wherein the corrugation alignment tabs are formed integral with the sheet.

5. The method of claim 1, wherein the sheet, the weld rod and the pipe segments all comprise a same material.

6. The method of claim 5, wherein the same material is high density polyethylene or polypropylene.

7. The method of claim 1, further comprising the step of exerting a continuous force to maintain compression between the coupling assembly and the pipe segments during the step of applying an electrical current.

8. The method of claim 7, wherein the step of exerting a continuous force to maintain compression is achieved by at least one strap wrapped around the coupling assembly.

9. The method of claim 1, wherein the step of circumferentially contacting comprises wrapping the coupling assembly around an external surface of the pipe segments.

10. The method of claim 1, wherein the step of circumferentially contacting comprises wrapping the coupling assembly about an internal surface of the pipe segments.

11. The method of claim 1, wherein the step of circumferentially contacting further comprises covering at least one corrugation on each of the first and second pipe segments.

12. The method of claim 1, wherein the weld rod is attached to the sheet by thermoforming.

13. The method of claim 1, wherein the thickness of corrugation elements of the first and second pipe segments are each of about the same thickness as the sheet.

14. The method of claim 13, wherein the thickness of corrugation elements of the first and second pipe segments and the sheet is about 1/8 inch.

15. The method of claim 1, wherein the weld rod comprises an elongate thermoplastic material having at least one resistance wire embedded therein.

16. The method of claim 1, wherein the steps of circumferentially contacting and applying are carried out while at least one of the pipe segments is situated within a trench.

17. A method for coupling pipe segments comprising:
providing first and second thermoplastic pipe segments arranged to form a fluid flow path therethrough;
aligning ends of the first and second pipe segments adjacent one another to form a joint;
providing a coupling assembly comprising a thermoplastic sheet having a flexible weld rod comprising a thermoplastic material attached to an outer surface of the thermoplastic sheet, the sheet having a thickness that is about the same as that of corrugation elements of each of the first and second pipe segments;
circumferentially contacting the first and second thermoplastic pipe segments with the coupling assembly by wrapping the coupling assembly about an internal surface of the first and second pipe segments such that the weld rod encircles the inner surface of the pipe segments on each side of the joint and the weld rod is in contact with the sheet and the internal surface of the pipe segments; and
while exerting a continuous force to maintain compression between the coupling assembly and the internal surface of the pipe segments, applying an electrical current to the weld rod to cause the weld rod, sheet and pipe segments to fuse to one another and form a circumferential weld seam on each side of the joint.

18. The method of claim 17, wherein the continuous force to maintain compression is achieved by at least one strap wrapped around the coupling assembly.

19. A method for coupling pipe segments comprising:
providing first and second thermoplastic corrugated pipe segments arranged to form a fluid flow path therethrough;
aligning ends of the first and second pipe segments adjacent one another to form a joint;
providing a coupling assembly comprising a thermoplastic sheet having a flexible weld rod comprising a thermoplastic material attached thereto and further comprising a plurality of corrugation alignment tabs attached to the sheet, the sheet having a thickness that is about the same as that of corrugation elements of each of the first and second pipe segments;
circumferentially contacting the first and second thermoplastic pipe segments with the coupling assembly by wrapping the coupling assembly around an external surface of the first and second pipe segments such that the weld rod encircles the pipe segment on each side of the joint and the weld rod is in contact with the sheet and the external surface of the pipe segments and such that at least one corrugation alignment tab is disposed within a valley between adjacent corrugations of the first pipe segment and at least one corrugation alignment tab is disposed within a valley between adjacent corrugations of the second pipe segment; and while exerting a continuous force to maintain compression between the coupling assembly and the external surface of the pipe segments, applying an electrical current to the weld rod to cause the weld rod, sheet and pipe segments to fuse to one another and form a circumferential weld seam on each side of the joint.

20. The method of claim 19, wherein the corrugation alignment tabs are formed integral with the sheet.

* * * * *